US009904624B1

(12) United States Patent
Huberty et al.

(10) Patent No.: US 9,904,624 B1
(45) Date of Patent: Feb. 27, 2018

(54) PREFETCH THROTTLING IN A MULTI-CORE SYSTEM

(71) Applicant: Apple Inc., Cupertino, CA (US)

(72) Inventors: Tyler J. Huberty, Sunnyvale, CA (US); Stephan G. Meier, Los Altos, CA (US); Khubaib Khubaib, Austin, TX (US)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 15/093,173

(22) Filed: Apr. 7, 2016

(51) Int. Cl.
| G06F 12/00 | (2006.01) |
| G06F 12/08 | (2016.01) |
| G06F 13/00 | (2006.01) |
| G06F 12/0862 | (2016.01) |
| G06F 12/0875 | (2016.01) |
| G06F 12/0811 | (2016.01) |

(52) U.S. Cl.
CPC ...... *G06F 12/0862* (2013.01); *G06F 12/0811* (2013.01); *G06F 12/0875* (2013.01); *G06F 2212/283* (2013.01); *G06F 2212/452* (2013.01); *G06F 2212/602* (2013.01)

(58) Field of Classification Search
CPC .............................. G06F 12/00; G06F 12/0215
USPC ................... 711/100, 118, 137, 154
See application file for complete search history.

(56) References Cited

U.S. PATENT DOCUMENTS

| 5,305,389 | A | 4/1994 | Palmer |
| 6,151,662 | A | 11/2000 | Christie et al. |
| 6,317,811 | B1 | 11/2001 | Deshpande et al. |
| 6,446,167 | B1 | 9/2002 | Mayfield et al. |
| 6,970,985 | B2 | 11/2005 | Moritz |

(Continued)

FOREIGN PATENT DOCUMENTS

| EP | 0402787 | 12/1990 |
| TW | 486628 B | 5/2002 |

(Continued)

OTHER PUBLICATIONS

Yasuo Ishii, et al., "Access Map Pattern Matching Prefetch: Optimization Friendly Method",University of Tokyo, 2009, pp. 1-5.

(Continued)

*Primary Examiner* — Tuan Thai
(74) *Attorney, Agent, or Firm* — Meyertons, Hood, Kivlin, Kowert & Goetzel, P.C.; Lawrence J. Merkel

(57) ABSTRACT

In an embodiment, a system may include multiple processors and a cache coupled to the processors. Each processor includes a data cache and a prefetch circuit that may be configured to generate prefetch requests. Each processor may also generate memory operations responsive to cache misses in the data cache. Each processor may transmit the prefetch requests and memory operations to the cache. The cache may queue the memory operations and prefetch requests, and may be configured to detect, on a per-processor basis, occupancy in the queue of memory requests and low confidence prefetch requests from the processor. The cache may determine if the per-processor occupancies exceed one or more thresholds, and may generate a throttle control to the processors responsive to the occupancies. In an embodiment, the cache may generate the throttle control responsive to a history of the last N samples of the occupancies.

18 Claims, 6 Drawing Sheets

(56) References Cited

U.S. PATENT DOCUMENTS

| | | | |
|---|---|---|---|
| 7,165,146 | B2 | 1/2007 | Wallin |
| 7,493,607 | B2 | 2/2009 | Moritz |
| 7,836,259 | B1 | 11/2010 | Filippo et al. |
| 7,975,108 | B1 | 7/2011 | Holscher et al. |
| 8,255,631 | B2 | 8/2012 | Chen et al. |
| 8,627,009 | B2 | 1/2014 | Mekheil |
| 8,856,447 | B2 | 10/2014 | Williams, III |
| 8,892,822 | B2 | 11/2014 | Chou |
| 8,924,651 | B2 | 12/2014 | Tang et al. |
| 9,015,422 | B2 | 4/2015 | Meier et al. |
| 2002/0069326 | A1 | 6/2002 | Richardson et al. |
| 2002/0087802 | A1 | 7/2002 | Al-Dajani et al. |
| 2003/0079089 | A1 | 4/2003 | Barrick et al. |
| 2007/0088915 | A1* | 4/2007 | Archambault ....... G06F 8/4442 711/137 |
| 2007/0088919 | A1 | 4/2007 | Shen et al. |
| 2007/0288697 | A1 | 12/2007 | Keltcher |
| 2008/0016330 | A1 | 1/2008 | El-Essawy et al. |
| 2008/0155196 | A1 | 6/2008 | Black |
| 2009/0199190 | A1 | 8/2009 | Chen et al. |
| 2009/0217004 | A1 | 8/2009 | Van De Waerdt et al. |
| 2009/0307691 | A1 | 12/2009 | Moscibroda et al. |
| 2010/0268892 | A1 | 10/2010 | Luttrell |
| 2011/0066811 | A1 | 3/2011 | Sander et al. |
| 2012/0159073 | A1 | 6/2012 | Jaleel et al. |
| 2013/0238861 | A1 | 9/2013 | Manne et al. |
| 2013/0254485 | A1 | 9/2013 | Kannan et al. |
| 2013/0346703 | A1 | 12/2013 | McCauley et al. |
| 2014/0108740 | A1 | 4/2014 | Rafacz et al. |
| 2014/0258641 | A1 | 9/2014 | Hooker et al. |
| 2016/0062768 | A1* | 3/2016 | Jagannathan ....... G06F 9/30047 711/137 |

FOREIGN PATENT DOCUMENTS

| | | | |
|---|---|---|---|
| TW | 200821925 | A | 5/2008 |
| TW | 200901027 | A | 1/2009 |

OTHER PUBLICATIONS

Yasuo Ishii, et al., "Access Map Pattern Matching for High Performance Data Cache Prefetch", Tokyo, Japan, published Jan. 2001, pp. 1-24.

International Search Report and Written Opinion from PCT/US2014/042633, dated Oct. 9, 2014, Apple Inc., pp. 1-9.

Notice of Preliminary Rejection in Korean Patent Application No. 10-2013-29235, dated May 16, 2014, 6 pages.

International Search Report and Written Opinion in Application No. PCT/US2013/030497, dated May 7, 2013, pp. 1-13.

Zhigang Hu, Margaret Martonosi, and Stefanos Kaxiras "TCP: Tag Correlating Prefetchers", Feb. 2003, Proceedings of the 9th International Symposium on High-Performance Computer Architecture (HPCA '03), pp. 1-10.

Fei Gao, Hanyu Cui, Suleyman Sair "Two-level Data Prefetching" 25th International Conference on Computer Design, 2007, pp. 1-8.

Harold W. Cain, Priya Nagpurkar, "Runahead Execution vs. Conventional Data Prefetching in the IBM POWER6 Microprocessor" International symposium on performance analysis of systems and software, 2010, pp. 1-10.

European Extended Search Report in application No. 13159754.4-1953 dated Jul. 26, 2013 pp. 1-7.

Notice of Last Preliminary Rejection in Korean Patent Application No. 10-2013-29235, dated Oct. 30, 2014, 4 pages.

Office Action in Taiwan Patent Application No. 102109728, dated Oct. 14, 2014, 15 pages.

U.S. Appl. No. 14/748,833, filed Jun. 24, 2015, Meier et al.

U.S. Appl. No. 15/093,213, filed Apr. 7, 2016, Meier et al.

Office Action, U.S. Appl. No. 14/748,833, dated Sep. 13, 2017, 31 pages.

* cited by examiner

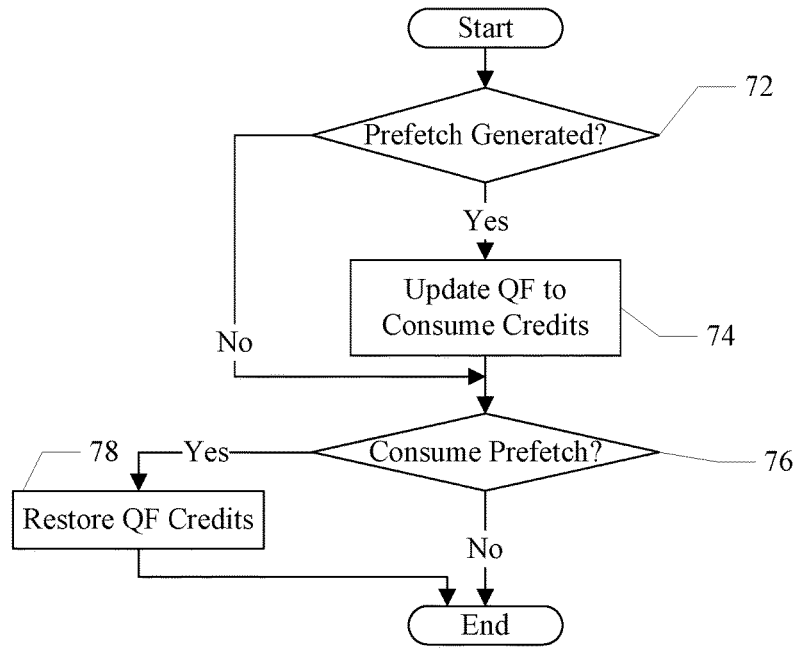

Fig. 4

| State | AQF | BQF |
|---|---|---|
| Initial Map Allocation | + | 0 |
| Data Cache Load Prefetch | - | 0 |
| Data Cache Store Prefetch | - | 0 |
| Data Cache Prefetch Consumed by Demand | + | 0 |
| Pending Prefetch Consumed by Demand | + | 0 |
| Prefetch Hit in Data Cache | - | 0 |
| Prefetch Initial Miss in External Cache | 0 | + |
| Prefetch Subsequent Miss in External Cache | 0 | + |
| External Cache Load Prefetch | - | - |
| External Cache Store Prefetch | - | - |
| External Cache Prefetch Consumed by Demand | + | 0 |
| External Cache Prefetch Consumed by Data Cache Prefetch | + | 0 |
| External Cache Pending Prefetch Consumed by Demand | + | 0 |

Fig. 5

PREFETCH THROTTLING IN A MULTI-CORE SYSTEM

BACKGROUND

Technical Field

Embodiments described herein are related to prefetch mechanisms in processors.

Description of the Related Art

Processors continue to be produced with both higher operating frequencies and higher average number of instructions executed per clock cycle (IPC). Memory latency, on the other hand, has decreased at a much slower rate. As a result, processors are often stalled awaiting instructions and/or data from memory. In order to improve performance, processors typically include one or more levels of caching. Data stored in the cache may be available at a much lower latency than data from memory. Thus, cache hits may be provided with low latency and may improve performance of the processors. Cache misses are fetched from memory and incur the higher memory latencies.

In an attempt to reduce the effective memory latency even further, processors can implement prefetching. Generally, prefetching involves predicting which cache blocks the processor will need to access soon, and initiating the memory read for the cache blocks prior to such accesses being generated via instruction code execution in the processor. If the prefetching successfully reads cache blocks that are later accessed by the processor, memory latency is reduced because the accesses are cache hits instead of cache misses. On the other hand, inaccurate prefetching can cause useful data to be removed from the cache. The inaccurately-prefetched data is not accessed, which reduces performance when useful data has been replaced by the inaccurately-prefetched data. Additionally, even if performance is not adversely affected or performance is improved by a small amount, excess power consumed by the processor to perform the prefetching might not be justified. Particularly, in portable devices in which the available energy is limited (e.g. from a battery), the excess power consumption can reduce battery life.

Another complication that prefetching can introduce is related to the finite bandwidth available in a cache/memory subsystem. Each prefetch consumes some of the bandwidth, and too much prefetching can cause delay in demand fetches if the bandwidth is overly consumed by prefetches. This issue can be exacerbated in multi-processor configurations that access the same cache/memory subsystem. A first processor, for example, could be generating demand fetches for cache misses, while a second processor could be experiencing more cache hits and generating prefetches. The prefetches from the second processor can interfere with the demand fetches from the first processor.

SUMMARY

In an embodiment, a system may include multiple processors and a cache coupled to the processors. Each processor includes a data cache and a prefetch circuit that may be configured to generate prefetch requests. Each processor may also generate memory operations responsive to cache misses in the data cache (demand fetches). Each processor may transmit the prefetch requests and memory operations to the cache. The cache may queue the memory operations and prefetch requests, and may be configured to detect, on a per-processor basis, occupancy in the queue of memory operations and low confidence prefetch requests from the processor. The cache may determine if the per-processor occupancies exceed one or more thresholds, and may generate a throttle control to the processors responsive to the occupancies. In an embodiment, the cache may generate the throttle control responsive to a history of the last N samples of the occupancies.

By monitoring occupancy on a per-processor basis, the throttle control may take into account variations in the traffic from the various processors. Thus, for example, one processor generating many demand fetches may result in prefetch throttling, allowing the demand fetches to consume more cache/memory system bandwidth. Including low confidence prefetches in the occupancy measurement may also result in prefetch throttling when higher numbers of low confidence prefetches are being transmitted, which may indicate that prefetching is having a lower overall accuracy and thus may be impacting performance negatively, or less positively than desired.

BRIEF DESCRIPTION OF THE DRAWINGS

The following detailed description makes reference to the accompanying drawings, which are now briefly described.

FIG. 4 is a flowchart illustrating operation of one embodiment of the prefetch circuit shown in FIGS. 1 and 2 to maintain quality factors.

FIG. 5 is a table illustrating one embodiment of quality factor updates.

Figure 1:
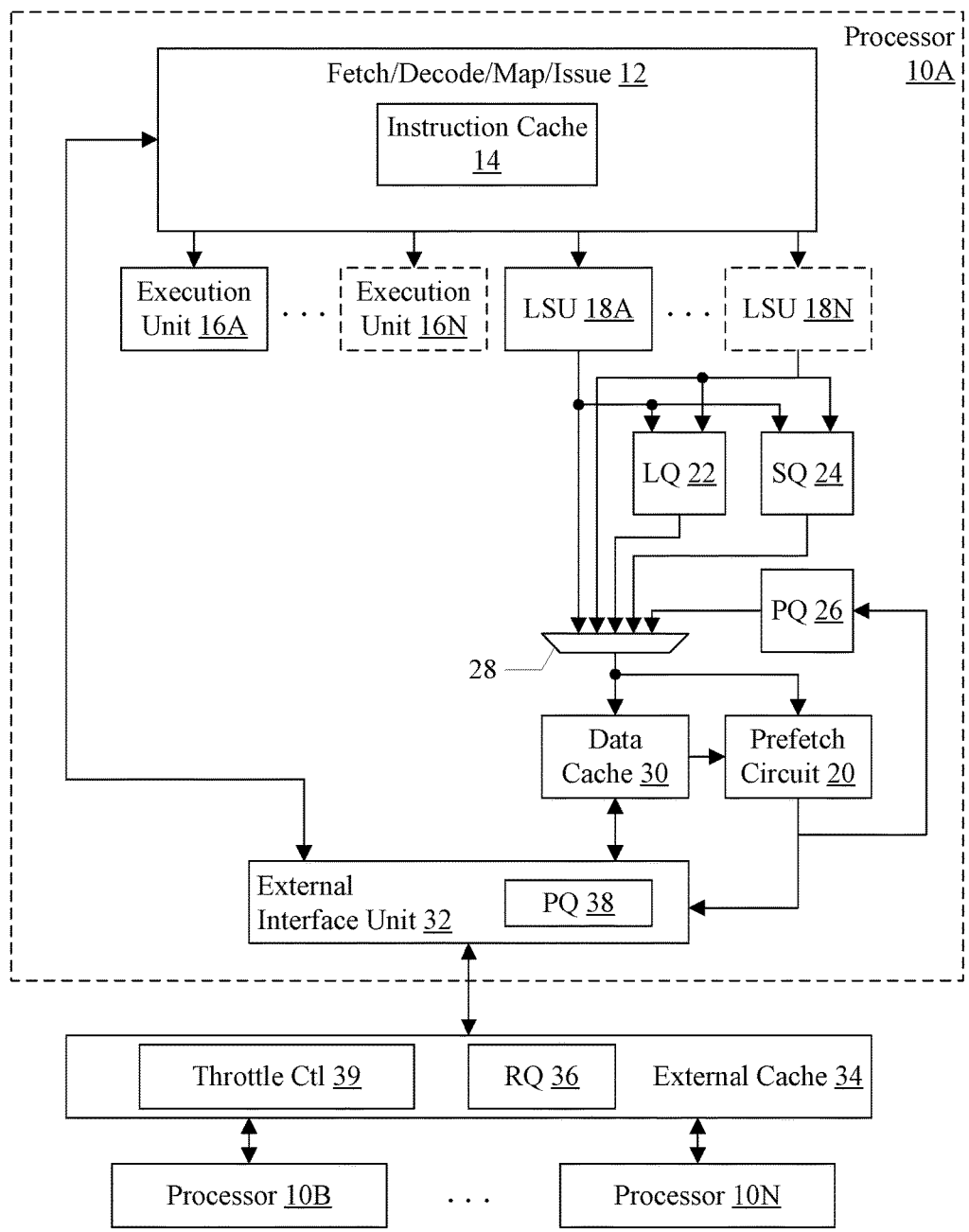
FIG. 1 is a block diagram of one embodiment of an apparatus including multiple processors and an external cache.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. §112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Processor Overview

FIG. 1 is a block diagram of one embodiment of a portion of a system including multiple processors 10A-10N and an external (to the processors 10A-10N) cache 34. In the embodiment of FIG. 1, the processor 10A is shown in greater detail. Other processors 10B-10N may be similar to the processor 10A. As illustrated in FIG. 1, the processor 10A may include a fetch/decode/map/issue (FDMI) unit 12 that may include an instruction cache 14. The processor 10A may further include one or more execution units 16A-16N, one or more load/store units (LSUs) 18A-18N, a prefetch circuit 20, a load queue (LQ) 22, a store queue (SQ) 24, a prefetch queue (PQ) 26, a multiplexor (mux) 28, a data cache 30, and an external interface unit 32. The external interface unit 32 may also include a prefetch queue 38. The data cache 30 and the FDMI unit 12 are coupled to the external interface unit 32, which is coupled to communicate external to the processor 10A (e.g. to the external cache 34 and/or to other components of a system including the processor 10A). The FDMI unit 12 is coupled to the execution units 16A-16N and the LSUs 18A-18N. The LSUs 18A-18N are coupled to the load queue 22 and the store queue 24, and the prefetch circuit 20 is coupled to the data cache 30 and the prefetch queue 26. The LSUs 18A-18N, the load queue 22, the store queue 24, and the prefetch queue 26 are coupled to the mux 28, which is coupled to the data cache 30 and the prefetch circuit 20.

The FDMI unit 12 may be configured to fetch instructions for execution by the processor 10A, decode the instructions into ops for execution, map the ops to speculative resources (e.g. rename registers) to permit out-of-order and/or speculative execution, and issue the ops for execution to the execution units 16A-16N and/or LSUs 18A-18N. More particularly, the FDMI unit 12 may be configured to cache instructions previously fetched from memory (through the external interface unit 32) in the instruction cache 14, and may be configured to fetch a speculative path of instructions for the processor 10A. The FDMI unit 12 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The FDMI unit 12 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 10A may be decoded into a single instruction operation, and thus the instruction operation may be essentially synonymous with instruction (although it may be modified in form by the decoder). The term "instruction operation" may be more briefly referred to herein as "op." The ops may be mapped to physical registers from the architectural registers used in the instructions, and then scheduled for issue. The scheduling may be centralized in a scheduler, or decentralized in reservation stations, in various embodiments, based on the availability of operands for each op. A register file or files (not shown in FIG. 1) may implement the physical registers of the processor 10A. There may be separate physical registers for different operand types (e.g. integer, media, floating point, etc.) in an embodiment. In other embodiments, the physical registers may be shared over operand types.

The execution units 16A-16N may include any types of execution units in various embodiments. For example the execution units 16A-16N may include integer, floating point, and/or media execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Media execution units may be configured to execute media ops. Media ops may be ops that have been defined to process media data (e.g. image data such as pixels, audio data, etc.). Media processing may be characterized by performing the same processing on significant amounts of data, where each datum is a relatively small value (e.g. 8 bits, or 16 bits, compared to 32 bits to 64 bits for an integer). Thus, media ops often include single instruction-multiple data (SIMD) or vector operations on an operand that represents multiple media data.

Thus, each execution unit may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops.

The LSUs 18A-18N may be configured to execute load/store memory ops. Generically, a memory operation (memory op) may be an instruction operation that specifies an access to memory (although the memory access may be completed in a cache such as the data cache 30 or the external cache 34). Generally, a load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. The LSUs 18A-18N may be configured to perform virtual address generation from various address operands of the load/store ops and may be configured to transmit the ops to the data cache 30 (through the mux 28) and to the load queue 22/store queue 24.

The load queue 22 may be configured to queue load ops that have been executed by the LSUs 18A-18N. The load ops may be queued awaiting cache fills if they miss in the data cache 30 (and/or TLB miss translation fills if translation is enabled). The load ops may be queued for ordering reasons as well. Similarly, the store queue 24 may be configured to queue store ops that have been executed by the LSUs 18A-18N. The store ops may be queue for cache/TLB fills, to await store data from the data source operand, and/or to await non-speculative/retired state to update the data cache 30 and/or memory. In other embodiments, a combined load/store queue may be used.

The data cache 30 may have any capacity and configuration. For example, set associative, fully associative, and direct mapped configurations may be used in various embodiments. The data cache 30 may be configured to cache data in cache blocks, where a cache block is a set of bytes from contiguous memory locations that are allocated and deallocated space in the cache as a unit. The cache blocks may be aligned to a cache block boundary (e.g. a 32 byte cache block may be aligned to a 32 byte boundary, a 64 byte cache block may be aligned to a 64 byte boundary, a 128 byte cache block may be aligned to a 128 byte boundary, etc.). Thus, the address of a byte may be divided into a cache offset portion (the least N significant bits of the address, where $2^N$ is the size of the cache block) and a cache tag portion (the remaining address bits). In an embodiment, the data cache 30 may be virtually indexed and a translation lookaside buffer (TLB, not shown in FIG. 1) may be accessed in parallel to translate the virtual address to a physical address of a memory location in the memory.

Cache misses in data cache 30 and instruction cache 14, as well as translation accesses, non-cacheable accesses, etc. may be communicated to the external interface unit 32. The external interface unit 32 may be configured to transmit transactions to the external cache 34 in response to the various accesses generated in the processor 10A. The external interface on which transactions are transmitted may have any form. For example, the external interface may be a shared bus, a point to point interconnect with packetized transactions, a full or partial crossbar, etc.

The external cache 34 may have any capacity and configuration as well. In an embodiment, the external cache 34 may be a level 2 (L2) cache. In another embodiment, the processor 10A may include an L2 cache and the external cache 34 may be a level 3 (L3) cache. The external cache 34 may be any level of cache in a memory hierarchy. The external cache 34 may be inclusive of the data cache 30, non-inclusive of the data cache 30, or exclusive of the data cache 30, in various embodiments. The cache block size in the external cache 34 may be the same size as the cache block size of the data cache 30, or may be a different cache block size (e.g. a larger cache block size).

The mux 28 may select among its various inputs (the LSUs 18A-18N, the load queue 22, the store queue 24, and the prefetch queue 26) to transmit cache accesses to the data cache 30. Control logic to the mux 28 (not shown in FIG. 1) may arbitrate among the requests using any desired arbitration scheme. The mux 28 may select multiple inputs to access the data cache 30 (and the prefetch circuit 20) concurrently (e.g. up to one per data cache port). In an embodiment, the data cache 30 may include two read ports and two write ports, for example, supporting up to two load ops (and/or store ops performing a hit check) and two store ops per clock cycle. More or fewer ports may be supported.

It is noted that any number and type of execution units 16A-16N may be included in various embodiments, including embodiments having one execution unit and embodiments having multiple execution units. Any number of LSUs 18A-18N may be included in various embodiments as well, including one LSU and multiple LSUs. Additionally embodiments that include load units (that execute only load ops) and/or store units (that execute only store ops) may be included with or without LSUs.

Prefetch and Throttling Overview

The prefetch queue 26 may store prefetch requests generated by the prefetch circuit 20 to access the data cache 30. The prefetch requests may be generated by the prefetch circuit 20 observing the load/store ops executed by the LSUs 18A-18N. Thus, the prefetch requests may be predicted read requests generated prior to the instruction code being executed by the processor 10A actually requesting the data. Viewed in another way, a prefetch request may be generated as a prediction that a subsequently-executed op will access the prefetched data. In contrast, cache requests by load/store ops may be referred to as demand fetches, because they are directly specified by the execution of code, rather than predicted. The prefetch requests are thus speculative, and may later be found to be incorrect if the demand fetches do not subsequently access the prefetched data.

In an embodiment, the prefetch circuit 20 may be an implementation of an access map-pattern match (AMPM) prefetcher with various enhancements. The AMPM prefetcher is described in more detail below. The prefetch circuit 20 may monitor the demand fetches/prefetch requests selected through the mux 28 to access the data cache 30, along with cache hit/miss status from the data cache 30, to generate prefetch requests. In other embodiments, the prefetch circuit 20 may implement other prefetch strategies. For example, a stream-based prefetcher may monitor load/store memory operation to detect predictable data streams (e.g. consecutive accesses in the stream may be separated by a specific, predictable pattern such as a fixed stride, for example).

The request queue 36 may be configured to receive requests from the processor 10A (and other processors 10B-10N in a multiprocessor configuration) to access the external cache 34. The requests may be demand fetches, or may be prefetch requests. The prefetch requests from the prefetch circuit 20 that are targeted at the external cache 34 (as opposed to those that target the data cache 30 and miss) may bypass the data cache 30 and may be enqueued by the prefetch circuit 20 in the prefetch queue 38 for transmission to the external cache 34. Prefetch requests that miss in the data cache 30, as well as demand fetch misses in the data cache 30 and/or the instruction cache 14, may be transmitted as requests by the external interface unit 32 to the external cache 34 as well. Each of these requests may be queued in the request queue 36; and the requests may be serviced by the external cache 34 from the request queue 36. If the requests are a miss in the external cache 34, the requests may be transmitted to lower level caches and/or a main memory in a system including the processor 10A.

The external cache in FIG. 1 also includes a throttle control circuit 39. The throttle control circuit 39 may monitor the memory requests from the processors 10A-10N and the prefetch requests which target the external cache 34 to determine when to throttle the prefetch requests. For example, if one or more processors 10A-10N are generating demand fetches that are causing the request queue 36 to become occupied, then prefetch requests may be throttled to permit the demand fetches to proceed. Similarly, if low confidence prefetch requests are present in the request queue 36 in significant numbers, they may be impeding demand fetches or high confidence prefetch requests. Low confidence prefetch requests may be part of a group of prefetch requests (e.g. from the same access map, or from the same stream in a stream-based prefetch circuit) which have showed lower relative accuracy than the high confidence prefetch requests. In one embodiment, the throttle control circuit 39 may measure the number of demand fetch requests and low confidence prefetch requests in the request queue 36 on a per-processor basis. Each number may be compared to one or more thresholds to determine if the processor is "busy" in the external cache 34 (e.g. the number exceeds the thresholds). A corresponding value, or weight, may be assigned to the processor based on the comparison, and the values may be summed. If the summed value exceeds another threshold, the throttle control circuit 39 may be more likely to throttle. In an embodiment, throttling may be based on the instantaneous determinations. In other embodiments, a history of samples of the determination may be maintained by the throttle control circuit 39, and throttling may be based on the history. More particularly, the amount of requested throttling may vary based on the history, with the lowest confidence prefetch requests throttled initially, and gradually increasing the level of confidence that is throttled as the occupancy of the request queue on a per-processor basis continues to show congestion in the external cache 34.

Prefetch Circuit

Figure 2:
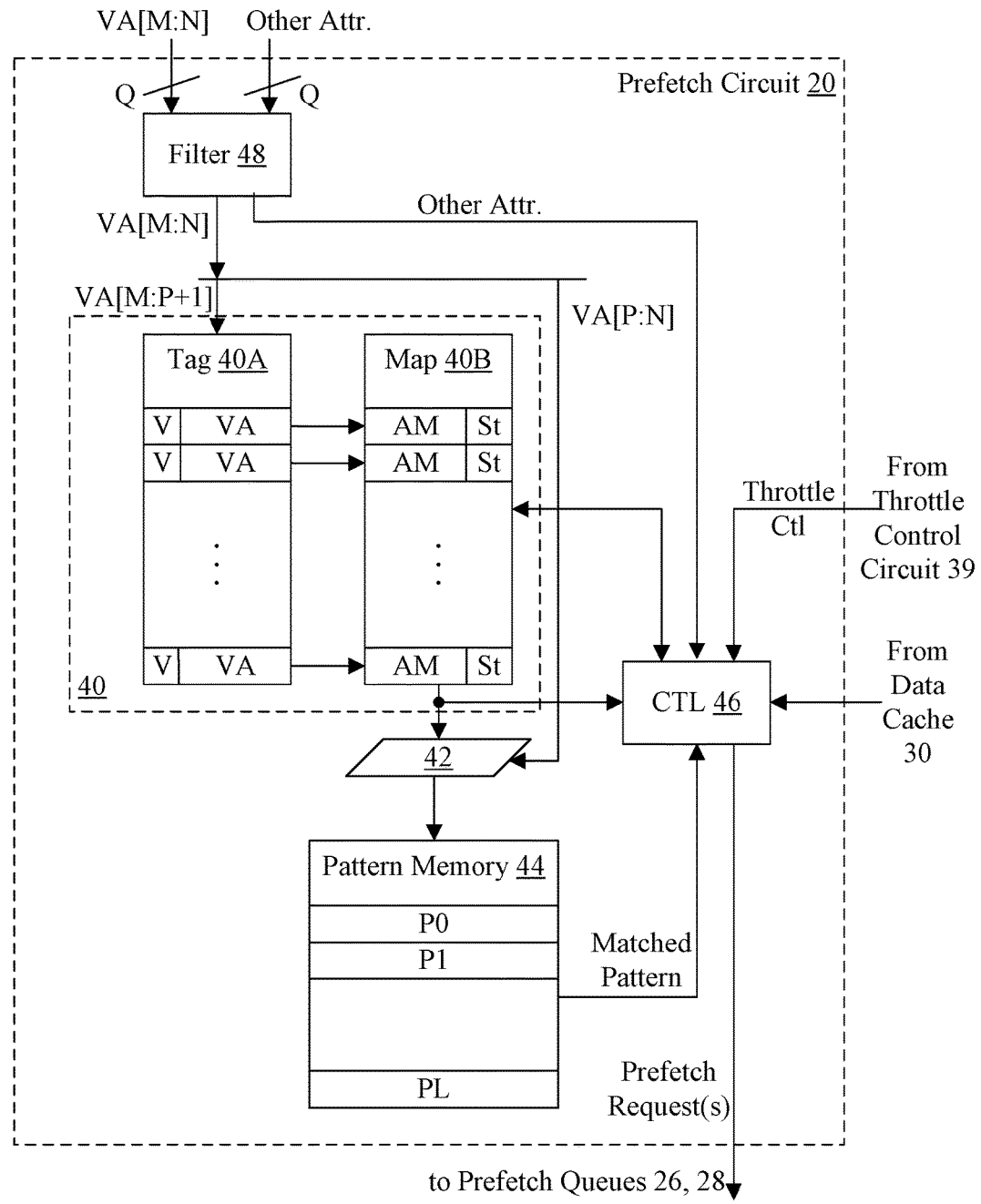
FIG. 2 is a block diagram of one embodiment of a prefetch circuit shown in FIG. 1.

Turning now to FIG. 2, a block diagram of one embodiment of the prefetch circuit 20 is shown. In the illustrated embodiment, the prefetch circuit 20 includes an access map memory 40, a shifter 42, an access pattern memory 44, a control circuit 46, and an input filter buffer 48.

The filter buffer 48 may receive Q concurrent memory operations from the LSUs 18A-18N, through the mux 28. Q may be an integer greater than 1 (e.g. 4, in the above example in which the data cache has 4 ports). The filter buffer 48 may capture information from the operations for presentation to the access map memory 40 and the control circuit 46. The filter buffer 48 may be configured to merge multiple memory operations to the same access map and present the operations to the access map memory 40, the shifter 42, and the control circuit 46. In the illustrated embodiment, the filter buffer 48 may be configured to present one operation per clock cycle, although other embodiments may be configured to present more operations in parallel, but less than Q operations. The size and complexity of the memory structures and circuitry in the prefetch circuit 20 to support concurrent operations may be reduced through use of the filter buffer 48.

The filter buffer 48 may capture the virtual address (or a portion thereof) from each memory operation as well as various other attributes that may be used by the prefetch circuit 20. For example, the prefetch circuit 20 may receive a physical address to which the virtual address translates. The physical address may actually be received later in time than the virtual address, and may be updated into the access map memory 40. The physical address may be used for prefetches to lower level caches such as the external cache 34, which may be physically addressed. The data cache 30 may be virtually addressed, in some embodiments.

The access map memory 40 and the shifter 42 are coupled to receive the virtual address of an access launched from the filter buffer 48 (or portions of the virtual address, as shown in FIG. 2), and the output of the access map memory 40 is coupled to the shifter 42. The control circuit 46 is coupled to the access map memory 40 and to the access pattern memory 46. The control circuit 46 may be configured to provide prefetch requests to the prefetch queues 26 and 38, and may be configured to receive cache hit/miss information from the data cache 30. The control circuit 46 may be configured to receive a throttle control input from the throttle control circuit 39, indicating the current amount of throttling. The shifter 42 is coupled to the access pattern memory 44. In the illustrated embodiment, the access map memory 40 includes a tag memory 40A and a map memory 40B.

The throttle control circuit 39 may be configured to signal no throttling (i.e. the prefetch circuit 20 may generate prefetch requests as desired) or one of multiple levels of throttling. The amount of throttling applied by the prefetch circuit 20 for a given level indicated by the throttle control circuit 39 may be fixed or programmable, in an embodiment. In one embodiment, each access map may have an associated quality factor that indicates a level of success of prefetches within that map. Measurements of the effectiveness of prefetching may be used to increase the quality factor (if the measurements indicate successful prefetching e.g. consumption of prefetched data) or decrease the quality factor (if the measurements indicate unsuccessful prefetching, e.g. prefetch requests that hit in the cache, indicating that the data has already been fetched, or prefetch requests that are never consumed). The levels of throttling may be mapped to levels of quality factor, and access maps having quality factors below the throttled level may not cause prefetch requests to be generated.

In an embodiment, prefetch requests that are targeted at the data cache 30 (i.e. they are attempted in the data cache 30 and cause prefetched data to be brought into the data cache 30) may be treated as demand fetches at the external cache 34. Accordingly, the prefetch requests that are throttled, in this embodiment, may be prefetch requests targeted at the external cache 34 (e.g. prefetch requests which bypass the data cache 30 and cause prefetched data to be brought into the external cache 34). Additional details regarding the quality factor are discussed in more detail below.

The embodiment of the prefetch circuit 20 shown in FIG. 2 may be an implementation of an AMPM prefetcher. The access map memory 40 may store multiple access maps covering various access regions in the virtual address space. The access maps may represent the accesses to the cache blocks in the respective access regions. When another access hits on an access map in the access map memory 40, the access map may be output and compared to various access patterns stored in the access pattern memory 44. If a match between a given access pattern and the access map is detected, prefetch requests indicated by the matching pattern may be generated. The access patterns may be determined from trace analysis performed on various code sequences expected to be executed by the processor 10A during use. Given a certain pattern of demand accesses and/or successful prefetches, for example, one or more prefetches may be predicted based on the trace analysis. The access patterns may be identified during design of the processor 10A and hardcoded into the access pattern memory 44. Alternatively, some or all of the access patterns may be programmable in the access pattern memory 44 and may be written to the access pattern memory 44 during initialization of the processor 10A (e.g. at reset) or at some other convenient time.

As mentioned above, the access map 40 may store multiple access maps covering various access regions in the virtual address space. The access region may be a region of the virtual address space that includes multiple contiguous cache blocks. The access region may be aligned to a boundary determined by the size of the access region. For example, if access regions cover 2 kilobytes (kB) each, then the access regions are aligned to 2 kB boundaries. The access regions may be any desired size. For example, 4 kB access regions may be defined. Generally, an access map may be a record of various cache accesses that have occurred to the cache blocks within the access region. Each cache block within the access region may have an associated symbol in the access map, indicating the type of access that has occurred. In one embodiment, accesses may include demand-accessed (symbol A), prefetched to data cache 30 (symbol P), prefetched to lower level cache (L), successful prefetch (symbol S), or invalid (symbol "."). Each symbol may be represented by a different code of a value stored for the cache block in the access map. Thus, three bits per cache block may be stored based on the above symbols.

A demand-accessed cache block may be a cache block that was accessed without having been prefetched in advance. Thus, a load or store to the cache block may have been executed, and may have missed in the data cache 30. A prefetched (P) cache block may be a cache block that was predicted to be accessed by the prefetch circuit 20, which generated a prefetch request that passed through the prefetch queue 26 and was presented to the data cache 30. Alternatively, the prefetched cache block may have had a prefetch request generated and inserted into the prefetch queue 26, but may or may not have been presented to the data cache 30. A prefetched (L) cache block may be a cache block that was predicted to be accessed by the prefetch circuit 20, which generated a prefetch request to the lower level cache (e.g. external cache 34). The prefetch request for an L symbol may be transmitted to the lower level cache without passing through data cache 30, in an embodiment. In other embodiments, data cache 30 may be checked for a hit for a prefetch request for an L symbol. In either case, the data prefetched from the memory system or a level of cache lower than the external cache 34 may be written to the external cache 34 rather than the data cache 30. A subsequent miss or prefetch to the data cache 30 may result in a hit in the external cache 34. A successfully prefetched cache block may be a cache block that was prefetched (either to the data cache 30 or the external cache 34), and was subsequently demand-accessed (and thus the demand access was a cache hit in the data cache 30 and/or the external cache 34). A successfully prefetched cache block may thus be an accurately prefetched cache block, since it was accessed. An invalid cache block in the access map may be a cache block that has not been accessed.

In an embodiment, there may be "prefetch in progress" symbols for each of the P and L symbols as well, indicating that a prefetch request has been generated but is not yet completed. It is noted that, while different prefetch symbols are provided in the access maps (and pattern maps), other embodiments may support prefetch requests to more than two levels of cache. An additional prefetch symbol may be added for each cache level.

The virtual address (VA) of the data cache access (not including the N least significant bits of the address, bits N−1:0, where $2^N$ is the size of a cache block) may be input to the prefetch circuit 20. The least significant P-N bits of the virtual address provided to the prefetch circuit 20 may be an offset within the access map to the cache block being accessed. Thus, the access maps may cover $2^{P+1}$ bytes. The remainder of the virtual address, bits M:P+1, may be a tag that may be compared to the tags in the tag memory 40A.

The tag memory 40A may include multiple entries, each entry storing a tag for a corresponding access map in the map memory 40B. In an embodiment, the access map memory 40 may be fully associative and thus the tag memory 40A may be content addressable memory (CAM). If a match is detected between the VA tag input to the access map memory 40 and an entry in the CAM 40A (and the valid bit is set), a hit is detected on the entry. A corresponding entry in the map memory 40B (e.g. a random access memory, or RAM) may be output by the access map memory 40 to the shifter 42. Each entry in the map RAM 40B may include the access map (symbols for each cache block in the access region, labeled AM in FIG. 2) and may optionally include state associated with the access map (labeled St in FIG. 2). Exemplary state for various embodiments will be described in more detail below.

The access patterns in the access pattern memory 44 may be centered on an access point, which may be in approximately the center of the access pattern. That is, the access point may be one position to the right or the left of the exact middle of the access pattern, since the access pattern may be an even number of symbols long and the exact middle is between the two symbols. If the access pattern is an odd number of symbols, the access point may be the center of the pattern. By placing the access point in the center, the patterns may permit both forward and reverse patterns of accesses to be detected. A forward pattern may be progressing at increasingly larger offsets within the access map (viewing the access map offset as a number), whereas a reverse pattern may be progressing at decreasingly smaller offsets. Furthermore, matches to symbols on both sides of the access point may be permitted to capture unusual access patterns.

Accordingly, based on the access map offset of the input VA, the shifter 42 may shift the access map to align the current access point of the access map to the access point in the pattern memory 44. The shifted access pattern may be provided to the access pattern memory 44, which may compare the shifted access pattern to the patterns. The access pattern memory 44 may thus be a read-only memory (ROM) with comparison circuitry, a CAM, or a combination of ROM and CAM if some access patterns are hardcoded and others are programmable. If a pattern is matched, the matched pattern may be output by the access pattern memory 44 to the control circuit 46. The control circuit 46 may be configured to generate one or more prefetch requests based on the matched pattern and may transmit the prefetch requests to the prefetch queue 26. In the illustrated embodiment, the access pattern memory 44 may include L+1 entries, storing L+1 access patterns labeled P0 to PL in FIG. 2. In an embodiment, the generated prefetch requests may include a pointer indication indicating whether or not pointer read activity in the access map has been observed and should be included in determining prefetches. In an embodiment, the access map and/or the matched pattern may be provided with the prefetch request as well, for the prefetch circuit 36.

A given access map may match more than one pattern in the pattern memory 44. Longer patterns (patterns having the most demand-accessed and/or successfully prefetched cache blocks) may be more likely to generate accurate prefetches. In an embodiment, the patterns in the pattern memory 44 may be sorted so that the longer patterns are nearest one end of the memory (e.g. the "top", where pattern P0 is stored, or the "bottom", where pattern PL is stored). The pattern memory 44 may include a priority encoder that selects the match nearest the top, or nearest the bottom, if there is more than one match. In this manner, the longest pattern that is matched may be naturally selected from the pattern memory 44 and provided to the control circuit 46. Other embodiments may not necessarily order the patterns as discussed in this paragraph, but may still output the longest pattern that is matched by the access map.

In addition to generating the prefetch requests, the control circuit 46 may be configured to update the hitting access map in the access map memory 40. The update may, in some cases, be affected by the cache hit/miss result and thus the cache hit/miss from the data cache 30 may be received by the control circuit 46. In the event of a miss on the access map memory 40, the prefetch circuit 20 may allocate an access map entry to the virtual address and may begin tracking the access map in the allocated entry.

Other embodiments may implement other types of prefetch mechanisms. For example, a stream-based prefetcher attempts to identify various data streams and prefetch additional data for those streams. A data stream may be a series of memory accesses which are related in a predicable fashion (e.g. consecutive accesses separated by a stride dynamically determined by the prefetch circuit). The streams may be learned by allocated entries in a memory similar to the memory 40, using a base address that may serve as a tag and having a stride used to generate additional prefetch addresses.

Figure 3:
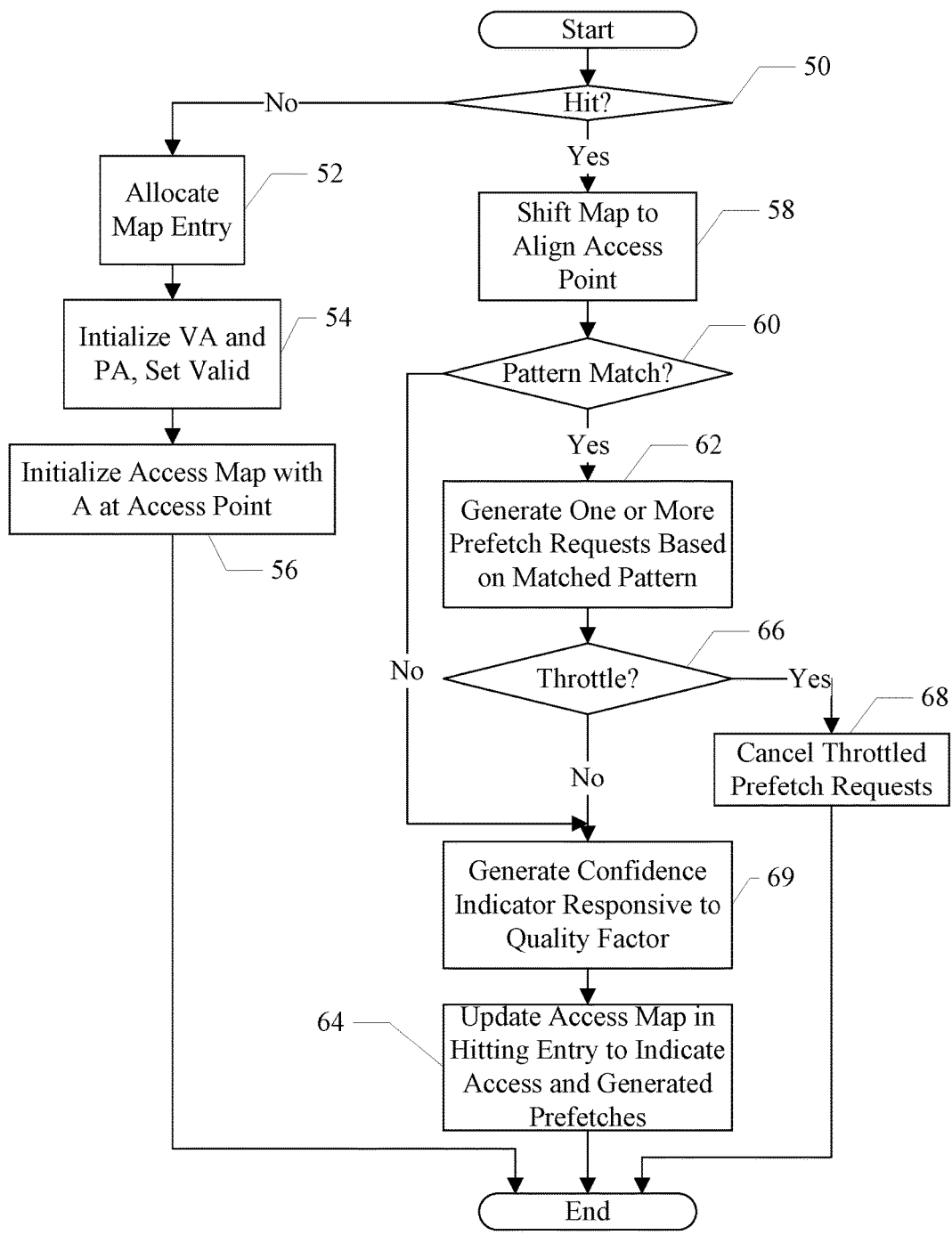
FIG. 3 is a flowchart illustrating operation of one embodiment of the prefetch circuit shown in FIGS. 1 and 2.

Turning next to FIG. 3, a flowchart is shown illustrating operation of one embodiment of the prefetch circuit 20, and more particularly the control circuit 46, in response to a virtual address received by the prefetch circuit 20 (in parallel with the address accessing the data cache 30). While the blocks are shown in a particular order for ease of understanding, other orders may be used. Blocks may be performed in parallel in combinatorial logic in the prefetch circuit 20/control circuit 46. Blocks, combinations of blocks, and/or the flowchart as a whole may be pipelined over multiple clock cycles. The prefetch circuit 20/control circuit 46 may be configured to implement the operation shown in FIG. 3.

The virtual address (or the access map tag portion of the address) may be presented to the access map memory 40. If the virtual address is a miss in the access map memory 40 (decision block 50, "no" leg), the control circuit 46 may be configured to allocate an entry in the access map memory 40 for the access region containing the virtual address (block 52). Any sort of allocation scheme may be used. For example, the control circuit 46 may maintain least recently used (LRU) data over the access map entries, and may replace the LRU entry if there are no invalid entries to be allocated. Various pseudo-LRU schemes may be used, or a random replacement may be used. The control circuit 46 may initialize the tag portion of the allocated entry (in the tag CAM 40A) with the virtual address of the access region (e.g. bits M:P+1 of the VA) and the physical address (PA) provided by a translation lookaside buffer (TLB) associated with the data cache, and may set the valid bit (block 54). The PA may be provided in a later clock cycle than the VA, in some embodiments. Additionally, the control circuit may initialize the access map portion of the entry (in the map RAM 40B) with a clear access map (e.g. all invalid) except for an A at the access point indicated by the access map offset (bits P:N of the VA) (block 56). The state field associated with the access map may also be initialized, if included.

If the virtual address is a hit in the access map memory 40 (decision block 50, "yes" leg), the access map memory 40 may output the corresponding access map to the shifter 42. The shifter 42 may shift the access map to align the access point (the offset to the accessed cache block in the access region—block 58). The shifted pattern output by the shifter 42 may be compared to the access patterns in the access pattern memory 44. If there is a match on a pattern (decision block 60, "yes" leg), the control circuit 42 may be configured to generate one or more prefetch requests based on the Ps and/or Ls in the matched pattern and further based on any previously generated prefetches recorded in the access map (block 62). That is, a previously generated or issued prefetch may not be generated again.

If prefetching is currently being throttled at the request of the external cache 34/throttle control circuit 39, and the quality factor associated with the hitting access map is lower than the threshold associated with the current level of throttling (decision block 66, "yes" leg), the generated prefetch requests may be cancelled (block 68). The access map entry may not be updated, thus permitting the same prefetch requests to be generated in a subsequent hit on the access map. More particularly, in an embodiment, prefetch requests targeted at the external cache 34 may be throttled (i.e. "L" prefetch requests). Other mechanisms for throttling may be used for the data cache 30, or the quality factor may be relied on alone for controlling the rate of prefetching to the data cache 30.

If the prefetch requests are not throttled (decision block 66, "no" leg), the control circuit 46 may be configured to generate a confidence factor for prefetch requests targeted at the external cache 34 (block 69). The confidence factor may be determined, e.g., as a threshold level of the quality factor from the hitting access map. The threshold level for the confidence factor may be fixed or programmable, and may be independent of the thresholds for the levels of throttling requested by the external cache 34/throttle control circuit 39. In an embodiment, one confidence threshold may be used and the confidence indicator may be a bit, set to indicate high confidence and clear to indicate low confidence. Other embodiments may use multiple confidence thresholds and a multiple bit confidence indicator. The confidence indictor may be used by the throttle control circuit 39 as discussed in more detail below.

If the prefetch requests are not throttled, the control circuit 46 may also update the access map in the hitting entry of the access map memory 40, independent of whether the access map matches a pattern in the access pattern memory 44 (block 64). In the present embodiment, the control circuit 42 may update the access map to indicate the current access as well as any generated prefetch requests. If the access map has an invalid symbol (".") at the access point and the access is a demand access, the "A" symbol may be inserted at the access point. If the access map has a prefetch symbol ("P") at the access point and the access is a demand access that hits in the data cache 30, the "S" symbol may be inserted at the access point. If the access map has an invalid symbol (".") at the access point and the access is a prefetch request, the "P" symbol may be inserted at the access point (or the "L" symbol, for prefetch requests to the external cache 34). The generated prefetches may be indicated at their respective points in the access map.

As mentioned above, in some embodiments, the state field in each access map entry may store one or more quality factors. A quality factor may be a value that measures or estimates the effectiveness of the prefetching for the corresponding access map (or data stream, for stream-based mechanisms). The quality factor may be used to further limit or prevent prefetching (above what the pattern itself already limits) when the effectiveness is not high. Additionally, in some embodiments, the quality factor may be used to "meter" prefetching that is effective but that is being consumed slowly. That is, using the quality factor to limit the prefetching may result in prefetched data being delivered closer to the time at which the data will be consumed by demand fetches. The scheduling of memory accesses in the memory system may be more efficient in some cases, since the prefetch traffic may be less bursty and thus the congestion in the memory system may be lower.

A pair of quality factors may be used to control prefetch request generation for the data cache 30 and the external cache 34 somewhat independently. The accuracy quality factor (AQF) may control the prefetch generation for the data cache 30 and the bandwidth quality factor (BQF) may control the prefetch generation for the external cache 34. Other embodiments which employ prefetching at more than two levels may employ a quality factor for each level.

As mentioned above, longer access patterns may tend to be more accurate in predicting prefetches, and so the quality factor may not be used if the access map length exceeds a threshold. The threshold may be fixed or programmable in the prefetch circuit, in some embodiments. Different threshold levels may be used for different cache levels (e.g. higher thresholds for lower levels).

In an embodiment, the quality factor may be a token-based or credit-based mechanism. The tokens/credits may represent an allowable amount of outstanding prefetching. Accordingly, tokens/credits may be consumed when a prefetch request is generated (and a prefetch request may only be generated if sufficient tokens/credits are available). A successful prefetch may return tokens/credits to the quality factor value. In an embodiment, a successful prefetch may return more tokens/credits than the generation of a prefetch request consumes, and the passage of time may not return tokens/credits. Alternatively, a more equal return of credits to credits consumed may be used, and the passage of time may also return tokens/credits to the quality factor.

FIG. 4 is a flowchart illustrating operation of one embodiment of the prefetch circuit 20, and more particularly the control circuit 46, in response to a pattern match in the access pattern memory 44 for an access map when quality factors are used. Other operation, e.g. as illustrated in FIG. 3 and discussed above, may also be performed. While the blocks are shown in a particular order for ease of understanding, other orders may be used. Blocks may be performed in parallel in combinatorial logic in the prefetch circuit 20/control circuit 46. Blocks, combinations of blocks, and/or the flowchart as a whole may be pipelined over multiple clock cycles. The prefetch circuit 20/control circuit 46 may be configured to implement the operation shown in FIG. 4.

The description of FIG. 4 below refers to a quality factor. The same set of operations may be performed for each quality factor for which the corresponding access pattern has at least one prefetch request to be generated. Thus, the operation may be performed with the AQF to generate prefetch requests if Ps are in the access map, and the operation may be performed with the BQF to generate prefetch requests if Ls are in the access map. In one embodiment, both AQF and BQF credits may be required to generate external cache prefetch requests (Ls).

If a prefetch request is generated (decision block 72, "yes" leg), the control circuit 46 may be configured to update the quality factor to consume the credits/tokens for a prefetch request or requests (block 74). A prefetch request may be generated if there is a hit in the access map memory 40, the matched pattern includes "P" and/or "L" symbols that have not been generated as prefetch requests, there is sufficient credit in the corresponding quality factor (AQF for "P" prefetch requests and BQF for "L" prefetch requests, or both AQF and BQF for "L" prefetch requests, in some embodiments) to generate the prefetch request, and the prefetch request is not throttled.

Additionally, if a prefetch is consumed by a demand fetch (changing a "P" symbol or an "L" symbol to an "S" symbol in the access map—decision block 76, "yes" leg), the control circuit may be configured to update the quality factor to restore the credits/tokens (block 78). In another embodiment, BQF credits may be returned responsive to prefetch request that miss the external cache 34. If the prefetch requests are not missing the external cache 34, then the data being operated upon is already in the external cache 34 and the prefetch requests are therefore not needed.

The number of credits/tokens consumed for a prefetch request and restored for a successful prefetch may vary in various embodiments. In one example, the AQF may be initialized with a defined number of credits/tokens. A maximum number of tokens may be supported for each quality factor, and the initialization of the AQF may be any amount within the range of 0 and the maximum. For example, about 75% of the maximum may be the initial amount of the AQF. Other actions and their effects on the AQF and BQF are shown in the table of FIG. 5, for an embodiment. In the table, a plus sign indicates that the actions increase the corresponding quality factor; a minus sign indicates that the actions decrease the corresponding quality factor; and a zero indicates no change to the corresponding quality factor. In the case of a decrease, if the number of credits/tokens involved in the decrease are not available (e.g. the decrease would reduce the quality factor below zero), then the action may not be taken. In the case of an increase, the number of credits/tokens may be capped at the maximum. The amount of each increase or decrease may vary, or may be the same, in various embodiments.

In the table, a load prefetch is a prefetch request for an expected load operation. Thus, any coherence state which allows the cache block to be read may be used as the memory system's response to the prefetch request. A store prefetch request is a prefetch request for an expected store operation. Thus, the store prefetch request may require a coherence state permitting update of the cache block in the memory system's response to the prefetch request. Data cache prefetches are prefetch requests to the data cache 30 (generated from Ps in the access map). External cache prefetches are prefetch requests to the external cache 34 (generated from Ls in the access map). In general, any set of events may be used to update quality factors corresponding to various levels of cache in a memory hierarchy, in various embodiments.

In an embodiment, the following generalized relationships may be used for the increases and decreases of the AQF and BQF, although other embodiments may use any relationship among the amounts. A data cache load prefetch may be used as the base amount on which the other increases/decreases are specified for this example. The AQF updates will be discussed first in this paragraph, followed by the BQF updates in the next paragraph. The data cache load prefetch may be about 4-6% of the maximum number of credits/tokens. Store data cache store prefetch requests may be about 1.25× to 1.5× the number of tokens/credits consumed for a data cache load prefetch (the "load credits/tokens," for brevity). Consumption of the data cache prefetch by a demand fetch (e.g. the demand fetch hits the prefetched data in the data cache) may be an increase of about 2× the load credits/tokens. Consumption of the data cache prefetch by a demand while the prefetch is still pending may be about 1.5× the load credits/tokens. If a prefetch request hits in the data cache, the prefetch request was not useful and thus may decrease credits/tokens (e.g. about 1.5× the load credits/tokens). Generation of external cache load prefetch requests may be a decrease of about 0.75× to 1.0× the load credits/tokens. External cache store prefetch requests may by about 1.0× to 1.25× the load credits/tokens. Consumption of the external cache prefetch by a demand fetch may be an increase of about 2.5× of the load credits/tokens, whereas consumption of the external cache prefetch by a data cache prefetch may be an increase of about 1.25× to 1.5× the load credits/tokens. Similarly, consumption of the external prefetch, while it is still pending, by an demand fetch may be an increase of about 1.25× to 1.5× the load credits/tokens.

The BQF may be initialized (e.g. to about 64-66% of the maximum credits/tokens) in response to an initial miss in the external cache for a given access pattern. Subsequent misses for the same access pattern may be an increase of about 2.5× the load credits/tokens. The BQF may be decreased in response to the generation of external cache prefetch requests (e.g. generation of external cache load prefetch requests may decrease BQF by about 0.75× to 1.0× the load credits/tokens. External cache store prefetch requests may by about 1.0× to 1.25× the load credits/tokens.

As mentioned previously, the above discussion is merely one example of the updates that may be made to the AQF and BQF and the events/actions which may cause updates. Other embodiments may vary the events/actions and/or the amount of credit/token update for the events/actions (and the relative amounts of update with respect to each other, as in the above example).

Figure 6:
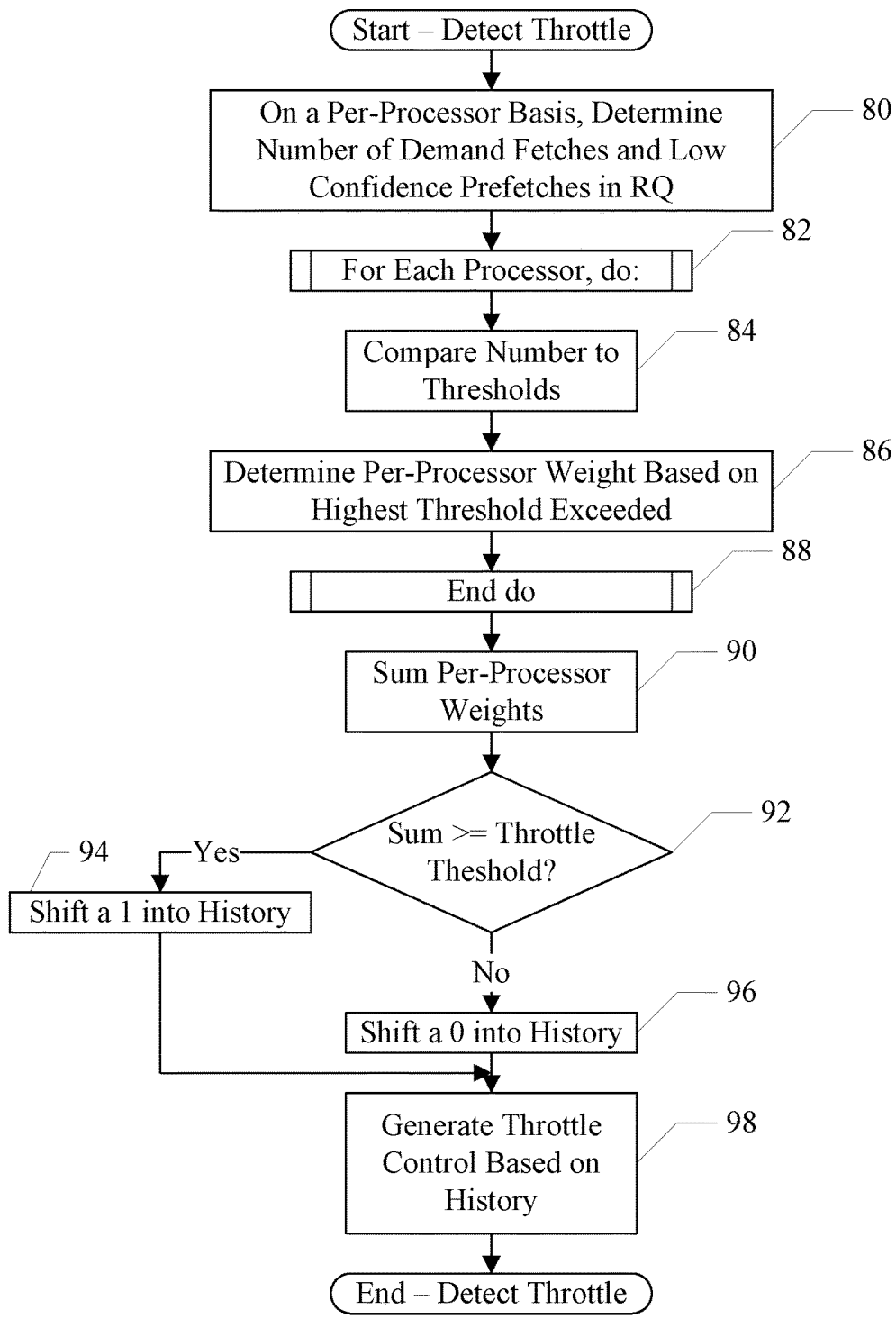
FIG. 6 is a flowchart illustrating operation of one embodiment of a throttle control circuit shown in FIG. 1.
Figure 7:
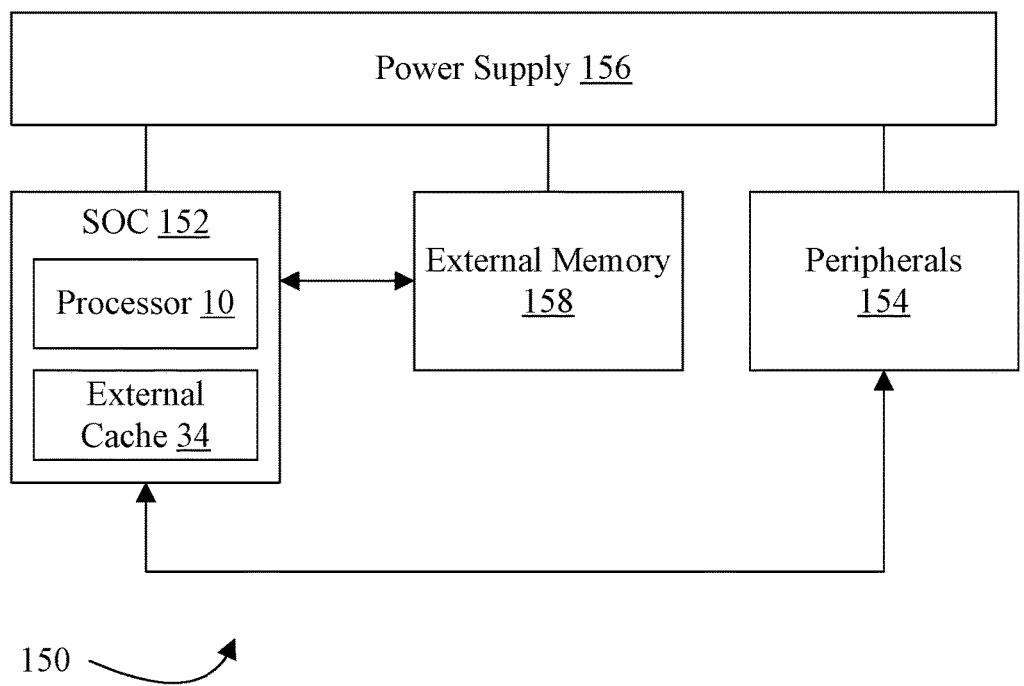
FIG. 7 is a block diagram of one embodiment of a system including the components illustrated in FIG. 1.

Turning now to FIG. 6, a flowchart is shown illustrating operation of one embodiment of the throttle control circuit 39 to detect and signal throttling to the processors 10A-10N. While the blocks are shown in a particular order for ease of understanding, other orders may be used. Blocks may be performed in parallel in combinatorial logic in the throttle control circuit 39. Blocks, combinations of blocks, and/or the flowchart as a whole may be pipelined over multiple clock cycles. The throttle control circuit 39 may be configured to implement the operation shown in FIG. 6.

In one embodiment, the operation of FIG. 6 may be performed on a periodic basis to form a sample that generates one history value to be included in the history of samples. Based on the current history, the throttle control to each processor may be asserted. For example, the sample may be generated one every N clock cycles, where N is an integer. In an embodiment, N=32, although larger or smaller values may be selected in other embodiments.

The throttle control circuit 39 may be configured to determine, on a per processor basis, the number of demand fetches and low confidence prefetch requests in the request queue 36 (block 80). That is, the throttle control circuit 39 may determine an occupancy of the requests from the processor in the request queue 36. By considering occupancy on a per-processor basis, busy processors (e.g. those processors experiencing significant miss traffic at the external cache 34) may be identified even if other processors are relatively idle. Low confidence prefetch requests may be those for which the prefetch circuit 20 in the initiating processor set the confidence indicator to a low level. As noted previously, the prefetch requests considered in this case may be prefetch requests that are targeted at the external cache 34, to bring data into the external cache 34. Prefetch requests targeted at the data cache 30 may appear to the external cache 34 to be demand fetches.

For each processor, the 10A-10N, the throttle control circuit 39 may perform blocks 84 and 86 (encapsulated by process blocks 82 and 88). The throttle control circuit 39 may perform the blocks 84 and 86 in parallel for each processor, in some embodiments. The throttle control circuit 39 may compare the number of demand fetches and low confidence prefetch requests in the request queue 36 that are from the corresponding processor 10A-10N to one or more thresholds (block 84). The thresholds may be programmable or fixed, in various embodiments. In one embodiment, there may two thresholds to compare the number of requests per processor: 16 and 4. Other threshold values and other numbers of thresholds may be used in other embodiments. Based on the result of the comparisons, each processor may be assigned a weight (block 86). While any weights may be used, in one embodiment the weight may be zero if the number is less than the lower threshold, 0.5 if the number is greater than or equal to the lower threshold, and 1.0 if the number is greater than or equal to the higher threshold.

The throttle control circuit 39 may be configured to sum the per-processor weights (block 90), and may compare the sum to one or more throttle thresholds (decision block 92). In one embodiment, the sum may be compared to a single throttle threshold to generate one bit of history. If the sum is greater than or equal to the throttle threshold, the history bit may be a one (decision block 92, "yes" leg and block 94). If the sum is less than the threshold, the history bit may be a zero (decision block 92, "no" leg and block 96). The history bit is shifted into the history, shifting out the oldest history bit. In an embodiment using 0.5 and 1.0 weights, for example, a throttle threshold of 2.0 may be used. Other embodiments may use a higher or lower throttle threshold with 0.5 and 1.0 weights.

The throttle control may be generated based on the history (block 98). For example, there may be four levels of throttling: no throttling, low throttling, medium throttling, and high throttling. The levels may be generated based on approximately equal amounts of history: less than 25% of the history being one=no throttling; 25% to 49% of the history being one=low throttling; 50% to 74% of the history being one=medium throttling; and 75% or more of the history being one=high throttling. For example, if 20 bits of history are kept, no throttling may occur if less than 5 bits are one; low throttling may occur if 5 to 9 bits are one; medium throttling may occur if 10 to 14 bits are one; and high throttling may occur if 15 or more bits are one. Different numbers of levels and breakdown of history to throttling may be used in other embodiments.

In one embodiment, the different levels of throttling may cause prefetch request throttling for quality factors (more particularly, AQFs) of various levels. For example, low throttling may throttle prefetch requests from access maps having AQF<50% of the maximum credits; medium throttling may throttle prefetch requests from access maps having AQF<75% of the maximum credits; and high throttling may throttle prefetch requests from access maps having AQF<90% of the maximum credits. Other embodiments may use different AQF levels.

System

Turning next to FIG. 10, a block diagram of one embodiment of a system 150 is shown. In the illustrated embodiment, the system 150 includes at least one instance of an system on a chip (SOC) 152 coupled to one or more peripherals 154 and an external memory 158. A power supply 156 is provided which supplies the supply voltages to the SOC 152 as well as one or more supply voltages to the memory 158 and/or the peripherals 154. In some embodiments, more than one instance of the SOC 152 may be included (and more than one memory 158 may be included as well). The SOC 152 may include one or more instances of the processor 10A and external cache 34 as illustrated in FIG. 1.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the SOC 152 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a plurality of processors, each processor:
      including a data cache and a prefetch circuit configured to generate prefetch requests for data to be prefetched into a second cache, wherein each prefetch request causes a prefetch of a different cache block of data;
      configured to transmit the prefetch requests to the second cache, each prefetch request having an associated indicator indicative of an accuracy of a plurality of previous prefetch requests associated with that prefetch request, wherein the accuracy is based on consumption of one or more cache blocks of the plurality of previously prefetched cache blocks by one or more demand fetches from the processor, wherein the accuracy is higher when consumption of the plurality of previously prefetched cache blocks is higher and accuracy is lower when consumption is lower; and
      configured to generate memory requests that miss the data cache to the second cache; and
   the second cache coupled to the plurality of processors, the second cache configured to:

queue the prefetch requests and the memory requests to access the second cache;

determine an occupancy of the queue by memory requests and prefetch requests for which the associated indicator indicates the accuracy is below a predetermined threshold, on a per-processor basis; and generate a prefetch throttle control to the plurality of processors responsive to the per-processor occupancies;

wherein the plurality of processors are configured to inhibit issuance of additional prefetch requests responsive to the prefetch throttle control.

2. The apparatus as recited in claim 1 wherein each processor is configured to maintain a plurality of quality factors, each quality factor associated with a group of prefetch requests, wherein the quality factor associated with a given group of prefetch requests is increased responsive to successful prefetch requests from the given group and decreased responsive to issuing prefetch requests from the given group, and wherein the prefetch throttle control applies to one or more second thresholds of a value of each quality factor, wherein prefetch requests having quality factors below a specified threshold of the one or more second threshold are inhibited, wherein the specified threshold is identified by the prefetch throttle control.

3. The apparatus as recited in claim 2 wherein the plurality of processors each implement an access map/pattern match prefetcher, and wherein the groups of prefetch requests are prefetch requests generated from the same access map in the access map/pattern match prefetcher, and wherein each quality factor of the plurality of quality factors is associated with a different access map in the access map/pattern match prefetcher.

4. The apparatus as recited in claim 3 wherein the plurality of processors each implement a stream-based prefetcher, and wherein each quality factor of the plurality of quality factors is associated with a different stream in the stream-based prefetcher.

5. The apparatus as recited in claim 2 wherein the associated indication is a bit indicating that the associated quality factor for the prefetch request is greater than or less than a third threshold.

6. The apparatus as recited in claim 1 wherein the second cache is configured to maintain a history of a last N determinations of the occupancy, wherein the second cache is configured to generate the prefetch throttle control responsive to the history.

7. The apparatus as recited in claim 6 wherein the history is based on whether a sum based on the per-processor occupancies exceeds a throttle threshold.

8. An apparatus comprising:
a plurality of processors, each processor:
including a data cache and a prefetch circuit configured to generate prefetch requests for data to be prefetched into a second cache;
configured to transmit the prefetch requests to the second cache, each prefetch request having an associated indicator indicative of an accuracy of previous prefetch requests associated with that prefetch request; and
configured to generate memory requests that miss the data cache to the second cache; and
the second cache coupled to the plurality of processors, the second cache configured to:
queue the prefetch requests and the memory requests to access the second cache;

recording record a history of occupancy of the queue, on a per-processor basis, by memory requests and prefetch requests having the associated indicator indicating accuracy below a predetermined level wherein the history covers N most recent samples based on the per-processor occupancy, and wherein each sample is determined responsive to a sum of values, each value corresponding to a respective processor of the plurality of processors cores and determined responsive to the respective processor's occupancy;

generate a prefetch throttle control to the plurality of processors responsive to the history;

wherein the plurality of processors are configured to inhibit issuance of additional prefetch requests responsive to the prefetch throttle control.

9. The apparatus as recited in claim 8 wherein the value associated with a first processor is a first value responsive to the first processor's occupancy exceeding a first threshold, and the value associated with the processor is a second value responsive to the first processor's occupancy exceeding a second threshold different from the first threshold, and wherein the first value is different from the second value.

10. The apparatus as recited in claim 9 wherein the second threshold is greater than the first threshold and the second value is greater than the first value.

11. The apparatus as recited in claim 8 wherein each sample is a bit indicative of whether or not the sum exceeds a first threshold.

12. The apparatus as recited in claim 8 wherein each processor is configured to maintain a plurality of quality factors, each quality factor associated with a group of prefetch requests, wherein the quality factor associated with a given group of prefetch requests is increased responsive to successful prefetch requests from the given group and decreased responsive to issuing prefetch requests from the given group, and wherein the prefetch throttle control applies to one or more second thresholds of a value of each quality factor, wherein prefetch requests having quality factors below a specified threshold of the one or more second threshold are inhibited, wherein the specified threshold is identified by the prefetch throttle control.

13. The apparatus as recited in claim 12 wherein the associated indication is a bit indicating that the associated quality factor for the prefetch request is greater or less than a third threshold.

14. In an apparatus comprising a plurality of processors coupled to a second cache, each of the plurality of processors including a data cache and a prefetch circuit configured to generate prefetch requests for data to be prefetched into the second cache, wherein each prefetch request causes a prefetch of a different cache block of data, a method comprising:

transmitting the prefetch requests from each processor to the second cache, each prefetch request having an associated indicator indicative of an accuracy of a plurality of previous prefetch requests associated with that prefetch request, wherein the accuracy is based on consumption of one or more cache blocks of the plurality of previously prefetched cache blocks by one or more demand fetches from the processor, wherein the accuracy is higher when consumption of the plurality of previously prefetched cache blocks is higher and accuracy is lower when consumption is lower;

transmitting memory requests that miss the data cache in each processor to the second cache;

queuing the prefetch requests and the memory requests to access the second cache;

determining an occupancy of the queue by memory requests and prefetch requests for which the associated indicator indicates the accuracy is below a predetermined threshold, on a per-processor basis, by the second cache;

generating a prefetch throttle control from the second cache to the plurality of processors responsive to the per-processor occupancies; and inhibiting issuance of additional prefetch requests from the plurality of processors responsive to the prefetch throttle control.

15. The method as recited in claim 14 further comprising:

maintaining a plurality of quality factors in each processor, each quality factor associated with a group of prefetch requests, wherein the quality factor associated with a given group of prefetch requests is increased responsive to successful prefetch requests from the given group and decreased responsive to issuing prefetch requests from the given group, and wherein the prefetch throttle control applies to one or more second thresholds of a value of each quality factor, wherein prefetch requests having quality factors below a specified threshold of the one or more second threshold are inhibited, wherein the specified threshold is identified by the prefetch throttle control.

16. The method as recited in claim 15 wherein the associated indication is a bit indicating that the associated quality factor for the prefetch request is greater than or less than a third threshold.

17. The method as recited in claim 14 further comprising:

maintaining a history of a last N determinations of the occupancy in the second cache; and generating the prefetch throttle control by the second cache responsive to the history.

18. The method as recited in claim 17 wherein the history is based on whether a sum of the per-processor occupancies exceeds a throttle threshold.

* * * * *

UNITED STATES PATENT AND TRADEMARK OFFICE
CERTIFICATE OF CORRECTION

PATENT NO. : 9,904,624 B1  
APPLICATION NO. : 15/093173  
DATED : February 27, 2018  
INVENTOR(S) : Tyler J. Huberty et al.

It is certified that error appears in the above-identified patent and that said Letters Patent is hereby corrected as shown below:

In the Claims

Claim 8, Column 20, Line 1, please delete "recording".

Claim 8, Column 20, Line 4-5, please delete "level wherein" and substitute --level, wherein--.

Signed and Sealed this
Seventeenth Day of April, 2018

Andrei Iancu
*Director of the United States Patent and Trademark Office*